(12) United States Patent
Vollmar et al.

(10) Patent No.: US 12,137,084 B2
(45) Date of Patent: Nov. 5, 2024

(54) ZERO TRUST MANAGEMENT FOR DATA COLLECTION DEVICES

(71) Applicant: International Business Machines Corporation, Armonk, NY (US)

(72) Inventors: Christopher J. Vollmar, Mississauga (CA); Adriana Pellegrini Furnielis, Valinhos (BR); Sarvesh S. Patel, Pune (IN); Frank N. Lee, Sunset Hills, MO (US); Abhishek Jain, Baraut (IN); Joseph W. Dain, Tucson, AZ (US); Daniel De Souza Casali, Elmhurst, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 18/061,506

(22) Filed: Dec. 5, 2022

(65) Prior Publication Data
US 2024/0187391 A1    Jun. 6, 2024

(51) Int. Cl.
*H04L 9/40*    (2022.01)
*H04L 9/08*    (2006.01)

(52) U.S. Cl.
CPC .......... *H04L 63/062* (2013.01); *H04L 9/0819* (2013.01); *H04L 63/08* (2013.01)

(58) Field of Classification Search
CPC ...... H04L 63/062; H04L 63/08; H04L 9/0819
See application file for complete search history.

(56) References Cited

U.S. PATENT DOCUMENTS

| | | | |
|---|---|---|---|
| 11,245,533 B2 | 2/2022 | Colacitti et al. | |
| 2013/0291056 A1* | 10/2013 | Gaudet | H04W 12/06 726/1 |
| 2014/0201533 A1* | 7/2014 | Kruglick | H04L 63/062 713/171 |
| 2017/0366360 A9 | 12/2017 | Thompson et al. | |
| 2018/0054316 A1* | 2/2018 | Tomlinson | H04L 9/3242 |
| 2019/0251279 A1 | 8/2019 | Emberson et al. | |

(Continued)

OTHER PUBLICATIONS

Aujila et al. "Leveraging Blockchain for Secure Drone-to-Everything Communications." IEEE Communications Standards Magazine, 2021, pp. 80-87.

(Continued)

*Primary Examiner* — Nelson S. Giddins
(74) *Attorney, Agent, or Firm* — CANTOR COLBURN LLP; Tihon Poltavets

(57) ABSTRACT

Computer-implemented methods for management of data collection devices. Aspects include creating a cluster of data collection devices and a distributed meta-key manager for the cluster and providing an authentication key for each data collection device to access the distributed meta-key manager. Aspects also include collecting and storing data by one or more of the data collection devices and periodically perform a quorum check for each data collection device of the cluster. Aspects further include updating an operational mode of each data collection device based on the quorum check and offloading the stored data from a data collection device based on successful verification of the stored data and the operational mode of the data collection device.

20 Claims, 10 Drawing Sheets

(56) References Cited

U.S. PATENT DOCUMENTS

| | | |
|---|---|---|
| 2021/0058416 A1 | 2/2021 | Subramanian et al. |
| 2022/0012347 A1 | 1/2022 | Mousseau et al. |
| 2022/0116221 A1 | 4/2022 | Mondello et al. |
| 2022/0121765 A1 | 4/2022 | Foong et al. |
| 2022/0169401 A1 | 6/2022 | Dicosola |
| 2022/0180449 A1 | 6/2022 | Leise et al. |

OTHER PUBLICATIONS

Liang et al. "Towards data assurance and resilience in IoT using blockchain." IEEE Military Communications Conference (MILCOM), 2017, 6 pages.

Rodriguez et al., "Flight Planning Optimization of Multiple UAVs for Internet of Things", Sensors; Basel vol. 21, 2021, 15 pages.

Won et al., "Certificateless cryptographic protocols for efficient drone-based smart city applications." IEEE Access 5, 2017, pp. 3721-3749.

* cited by examiner

ZERO TRUST MANAGEMENT FOR DATA COLLECTION DEVICES

BACKGROUND

The present invention generally relates to data collection devices, and more specifically, to computer systems, computer-implemented methods, and computer program products for zero trust management for data collection devices.

In general, a data collection device is a computing device that is configured to collect and store data. In some cases, data collection devices are deployed in a network and during periods of operation the data collection devices may have limited or no connectivity to the network. During operation, especially during periods of limited or no connectivity to the network, the data collection devices may be subjected to cyber-attacks that may attempt to encrypt, exfiltrate, and/or corrupt data collection devices. In addition, cyber-attacks may seek to inject false data or insert malware/ransomware onto the data collection devices.

SUMMARY

Embodiments of the present invention are directed to a method for the management of data collection devices. According to an aspect, a computer-implemented method includes creating a cluster of data collection devices and a distributed meta-key manager for the cluster and providing an authentication key for each data collection device to access the distributed meta-key manager. Aspects also include collecting and storing data by one or more of the data collection devices and periodically perform a quorum check for each data collection device of the cluster. Aspects further include updating an operational mode of each data collection device based on the quorum check and offloading the stored data from a data collection device based on successful verification of the stored data and the operational mode of the data collection device.

According to another non-limiting embodiment of the invention, a system for the management of data collection devices is provided. The system includes a memory having computer readable instructions and one or more processors for executing the computer readable instructions, the computer readable instructions include creating a cluster of data collection devices and a distributed meta-key manager for the cluster and providing an authentication key for each data collection device to access the distributed meta-key manager. The computer readable instructions also include collecting and storing data by one or more of the data collection devices and periodically perform a quorum check for each data collection device of the cluster. The computer readable instructions further include updating an operational mode of each data collection device based on the quorum check and offloading the stored data from a data collection device based on successful verification of the stored data and the operational mode of the data collection device.

According to another non-limiting embodiment of the invention, a computer program product for management of data collection devices is provided. The computer program product includes a computer readable storage medium having program instructions embodied therewith, the program instructions executable by a processor to cause the processor to perform operations. The operations include creating a cluster of data collection devices and a distributed meta-key manager for the cluster and providing an authentication key for each data collection device to access the distributed meta-key manager. The operations also include collecting and storing data by one or more of the data collection devices and periodically perform a quorum check for each data collection device of the cluster. The operations further include updating an operational mode of each data collection device based on the quorum check and offloading the stored data from a data collection device based on successful verification of the stored data and the operational mode of the data collection device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
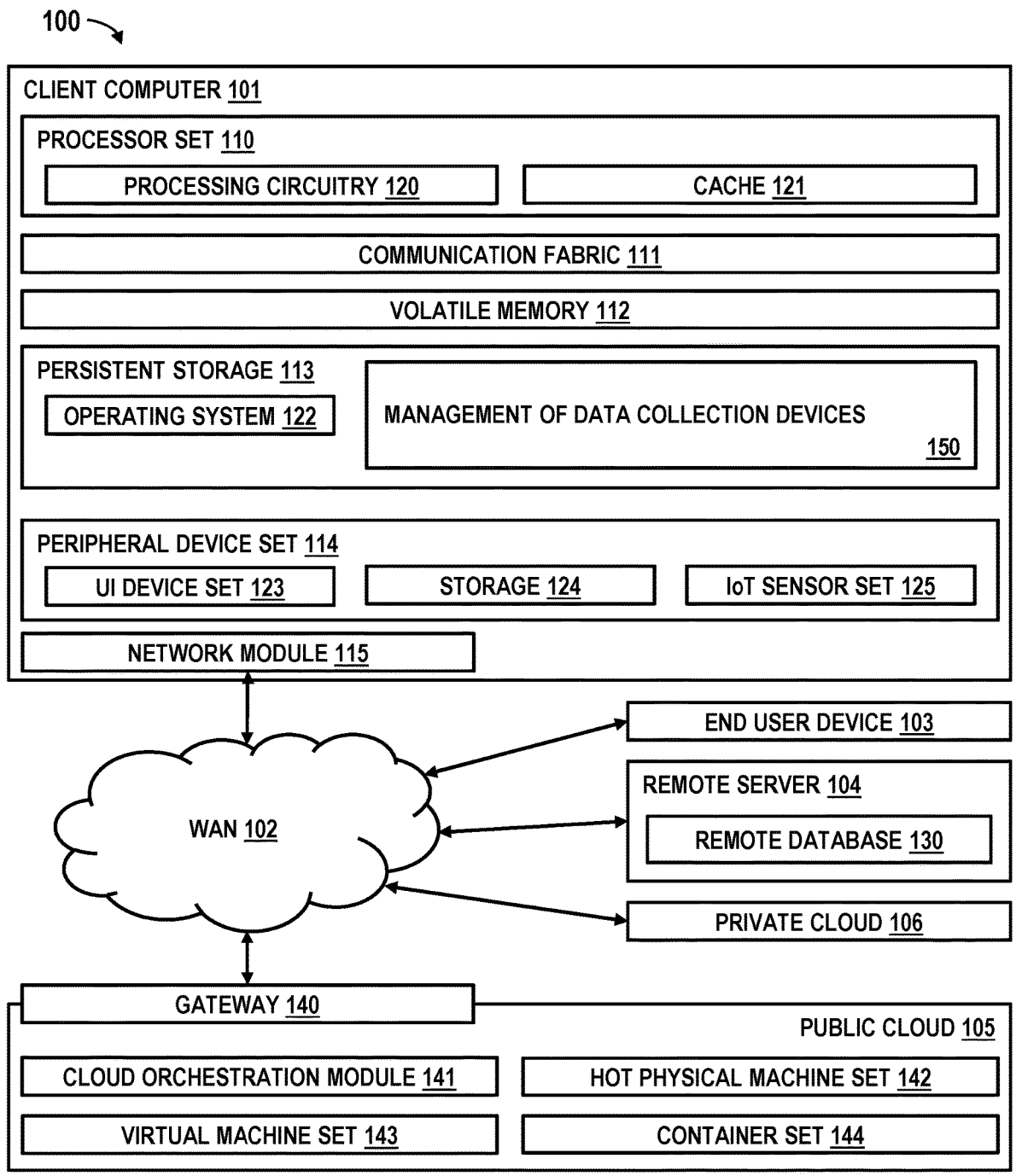
FIG. 1 depicts a block diagram of an example computer system for use in conjunction with one or more embodiments of the present invention.

As discussed above, data collection devices may be subjected to various types of cyber-attacks. In exemplary embodiments, methods, systems, and computer program products for the management of data collection devices are provided that provide protection against such cyber-attacks. The management of data collection devices is a zero-trust management system that utilizes multiple layers of security to detect and mitigate the effects of potential cyber-attacks. In many cases, the data collection devices are part of a network of devices and are located at the edge of the network. Accordingly, the data collection devices are also referred to herein as edge devices.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as management of data collection devices 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
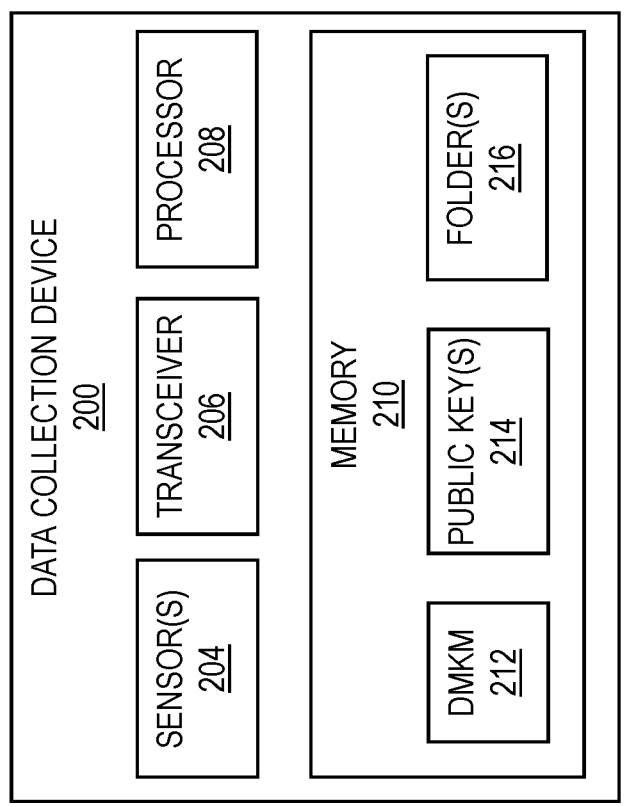
FIG. 2 is a block diagram of a data collection device in accordance with one or more embodiments of the present invention.

Referring now to FIG. 2, a block diagram of a data collection device 200 in accordance with one or more embodiments of the present invention is shown. In exemplary embodiments, the data collection device 200 includes one or more sensors 204, a transceiver 206, a processor 208, and a memory 210. In exemplary embodiments, the one or more sensors 204 include sensors that are configured to collect data that is stored in the memory 210 and sensors 204 that are configured to determine an operational characteristic of the data collection device 200. For example, the one or more sensors 204 can include a camera, an accelerometer, a video collection device, scientific data collection devices such as infrared, radiation, crash or impact sensors or other similar sensors. Sensors can also include temperature and environmental sensors including but not limited to temperature, humidity, moisture, rainfall, wind, barometer, salinity measurements, water/wave current, light/solar sensors, a global positioning system (GPS) sensor, and the like. In exemplary embodiments, the transceiver 206 is configured to facilitate communication by the data collection device 200 with other nearby data collection devices and/or with a communications network, such as a cellular communications network. The processor 208 may be a discrete logic circuit(s) having logic gates for implementing logic functions upon data signals, an application-specific integrated circuit (ASIC) having appropriate combinational logic gates, a programmable gate array(s) (PGA), a field programmable gate array (FPGA), or the like.

In exemplary embodiments, the memory 210 includes a distributed meta-key manager (DMKM) 212, one or more public keys 214, and one or more folders 216. In exemplary embodiments, the one or more public keys 214 are used by the processor 208 to encrypt data collected by the one or more sensors 204, which are stored in folders 216. In exemplary embodiments, the DMKM 212 is configured to store only a portion of a full key list for a cluster of data collection devices, including the data collection device 200. As a result, the data collection device 200 will not be able to decrypt the data stored in the folder 216 unless a minimum number of data collection devices, referred to herein as a quorum, in the cluster is in communication with the data collection device 200.

Figure 3:
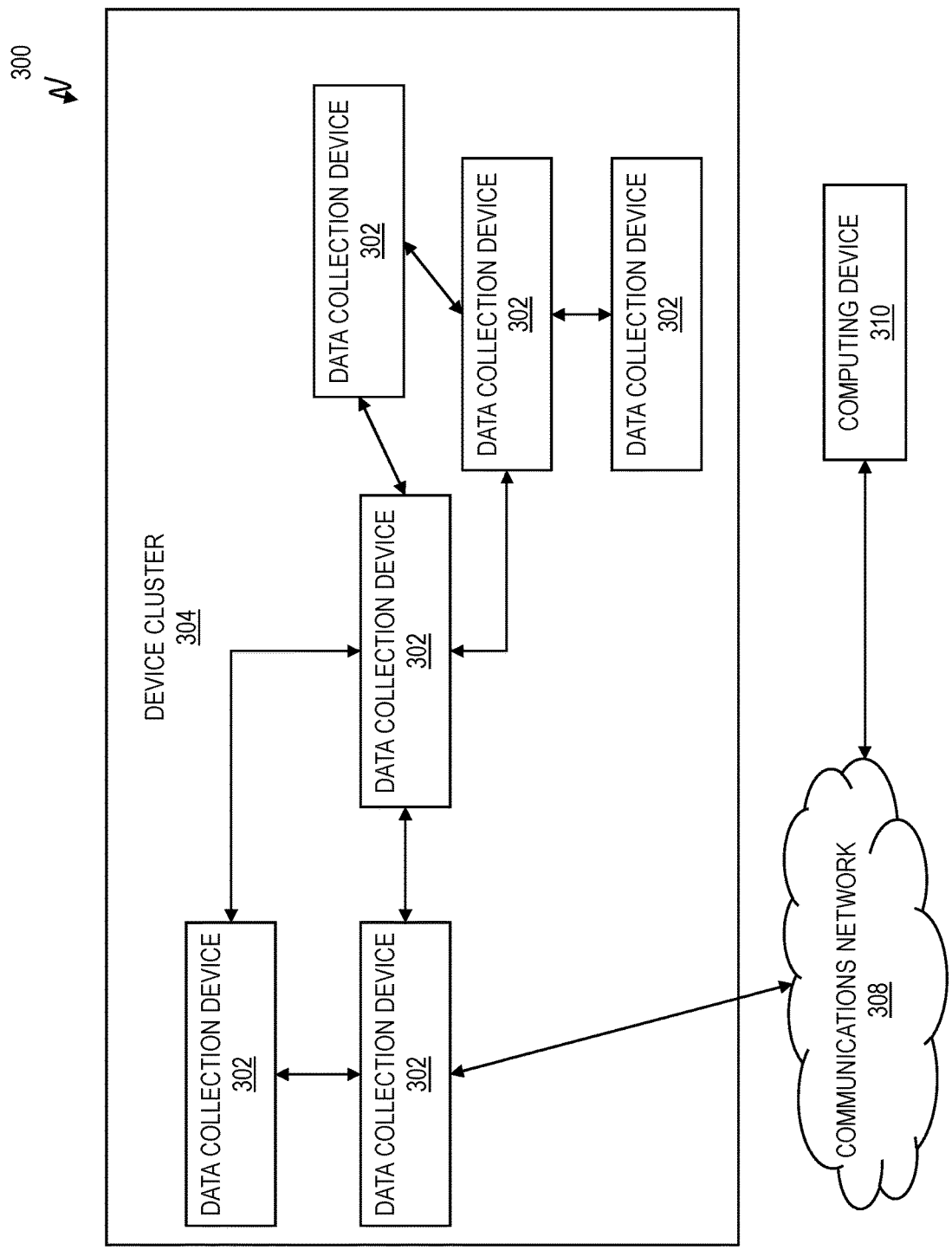
FIG. 3 is a block diagram of a system for collecting data with a network of data collection devices in accordance with one or more embodiments of the present invention.

Referring now to FIG. 3, a block diagram of a system 300 for collecting data with a network of data collection devices in accordance with one or more embodiments of the present invention is shown. In exemplary embodiments, the system 300 includes a plurality of data collection devices 302 that are part of a device cluster 304. In the illustrated embodiment, each of the data collection devices 302 are in communication with at least one other data collection device 302. However, in many cases, one or more of the data collection devices 302 may temporarily be unable to communicate with any of the remaining data collection devices 302 in the device cluster 304. For example, one or more of the data collection devices 302 may be disposed on a mobile device, such as an unmanned aerial vehicle, and may temporarily be unable to communicate with any of the remaining data collection devices 302 in the device cluster 304. In another example, the one or more of the data collection devices 302 may be unmanned or unattended water based sensor devices or arrays.

The system 300 also includes a communications network 308 that at least one of the data collection devices 302 in the device cluster 304 is connected to. The communications network 308 may include one or more public and/or private communications networks such as an intranet, a cellular communications network, the Internet, and the like. The system 300 also includes a computing device 310 that is configured to communicate with one or more data collection devices 302 via the communications network 308. The computing device 310 is configured to obtain data collected by one or more data collection devices 302 of the device cluster 304. In one embodiment, the computing device 310 is embodied in a computer 101, such as the one shown in FIG. 1.

Figure 4:
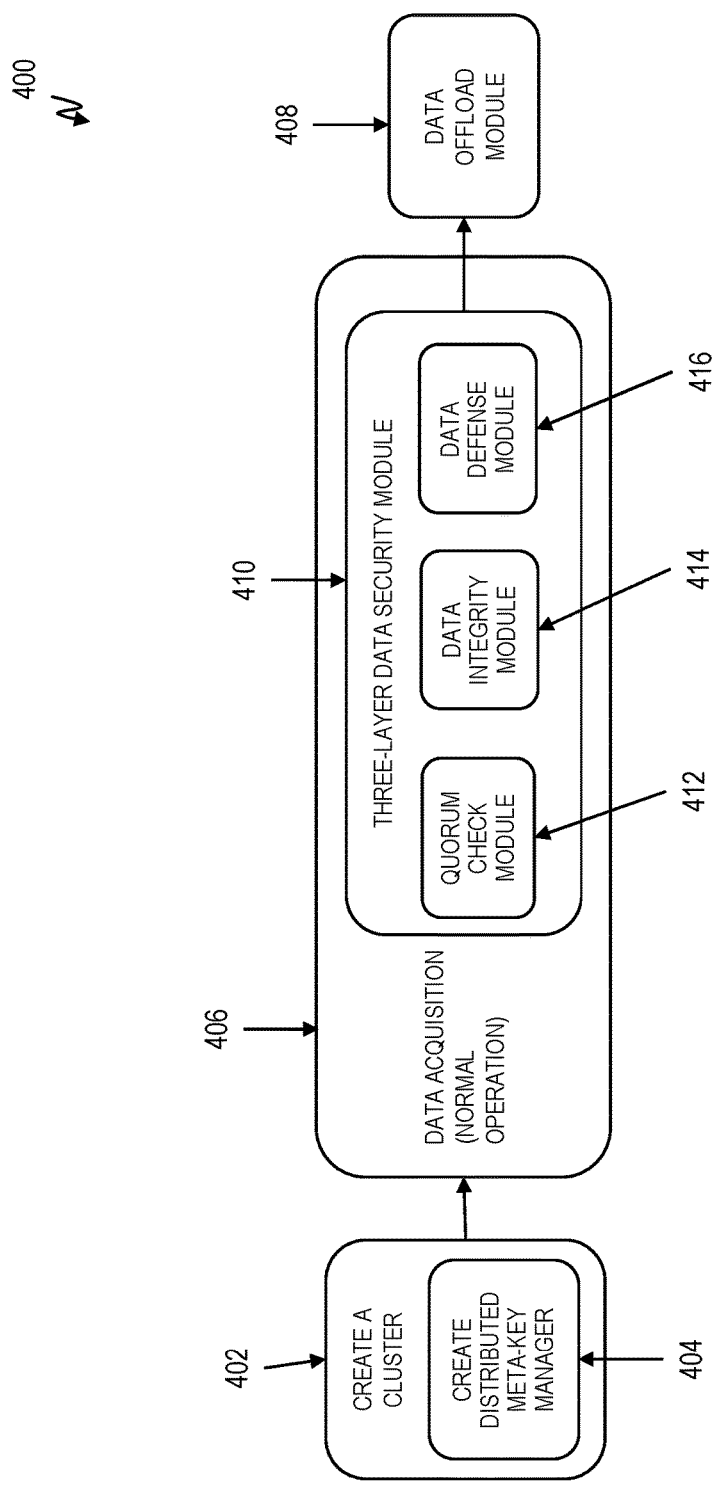
FIG. 4 is a flowchart of a method for the management of data collection devices in accordance with one or more embodiments of the present invention.

Referring now to FIG. 4, a flowchart of a method 400 for the management of data collection devices in accordance with one or more embodiments of the present invention is shown. As illustrated, the method 400 begins at block 402 by creating a cluster of data collection devices. In exemplary embodiments, creating the cluster of data collection devices includes setting one or more policies that control the security and behavior of the data collection devices in the cluster. The policies may include, but are not limited to, geolocation restrictions of where reads of data stored on the data collection devices are permitted or not permitted; policies governing the sharing of data across data collection devices; policies governing devices that can perform data reads; policies governing the timeframe after disconnection from the cluster that a data collection devices is allowed to rejoin the cluster; policies governing the quorum required for performing both reads and writes; policies governing activity that is treated as suspicious activity, and the like. In exemplary embodiments, the policies are stored in the memory of each data collection device.

In exemplary embodiments, creating the cluster 402 also includes identifying all participant data collection devices and creating authentication keys for each data collection device to access a Distributed Meta-Key manager (DMKM). In addition, creating the cluster 402 also includes establishing the cluster communication protocol and setting up the quorum settings the counter for quorum loss on all devices. As shown at block 404, creating the cluster 402 also includes creating a DMKM using an erasure-code of variable sizes to distribute the meta-key data on all devices so that the data is protected in case of device failure or loss.

During normal operation, as shown at block 406, the data collection devices are configured to collect, encrypt and locally store data based on the policies in the DMKM. In addition, during normal operations, a three-layer security module 410 is executed to protect the data collection devices from malicious activity. The three-layer security module 410 includes a quorum check module 412, a data integrity module 414, and a data defense module, which are explained in further detail with reference to FIGS. 6, 7, and 8 respectively. The method 400 end at block 408 by executing a data offload module to offload the data from one or more the data collection devices. The operation of the data offload module is explained in further detail with reference to FIG. 9.

Figure 5:
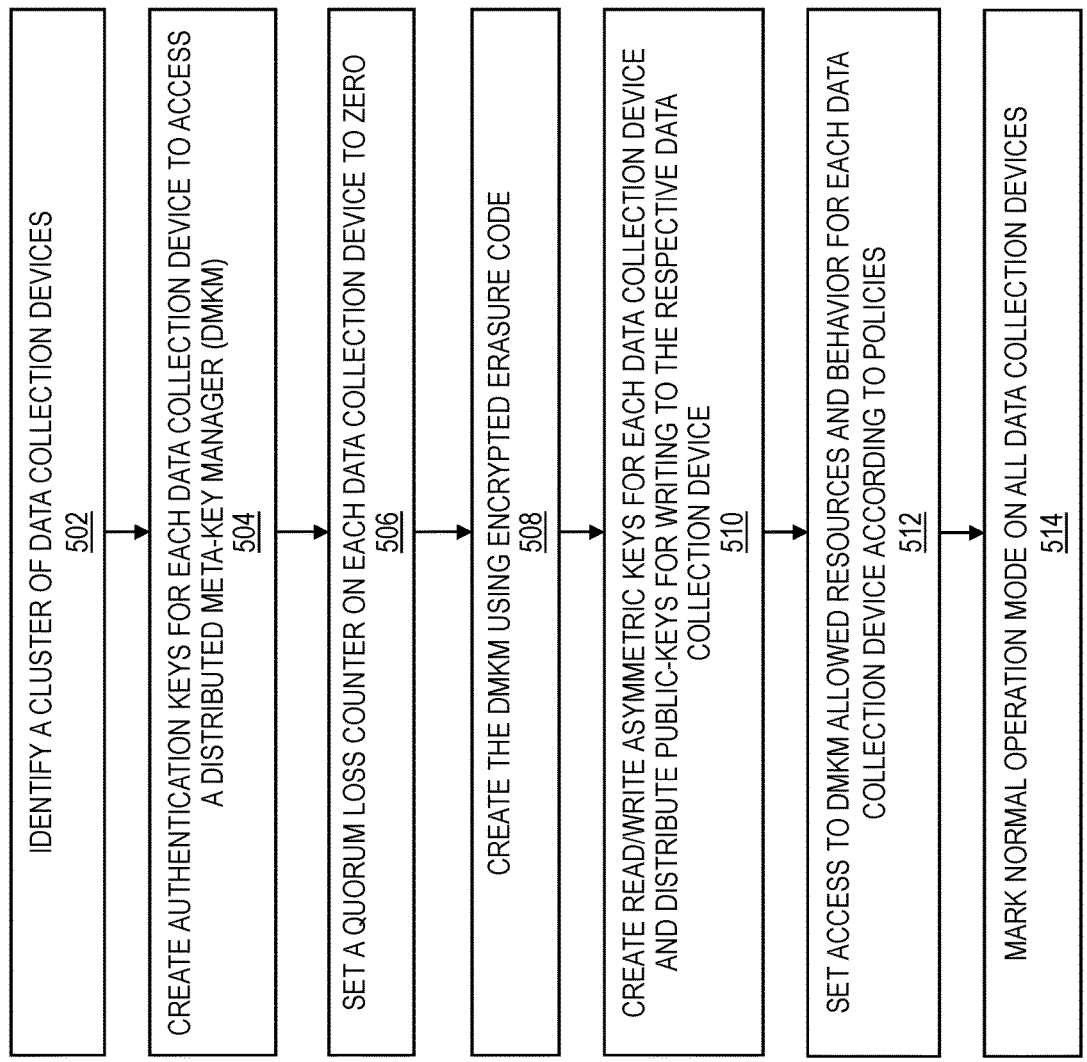
FIG. 5 is a flowchart of a method for creating a cluster of data collection devices in accordance with one or more embodiments of the present invention.

Referring now to FIG. 5, a flowchart of a method 500 for creating a cluster of data collection devices in accordance with one or more embodiments of the present invention is shown. The method 500 begins at block 502 by identifying a plurality of data collection devices that will make up the cluster. Next, as shown at block 504, the method 500 includes creating authentication keys for each data collection device to access a Distributed Meta-Key Manager (DMKM). The method 500 also includes setting a quorum loss counter on each data collection device to zero, as shown at block 506. Next, as shown at block 508, the method 500 includes creating the DMKM using encrypted erasure code. Once the DMKM has been created, the method 500 proceeds to block 510 and creates read/write asymmetric keys for each data collection device and distributes the public-keys for writing to the respective data collection device.

In exemplary embodiments, all of the public/private keys are stored on the DMKM. All of the private keys will be protected and only accessed by the DMKM that will be running as privileged mode (root) on each data collection device on a root only readable directory that is encrypted at rest. A key pair for write and read on the first directory will be created and both will be maintained on the DMKM, and only the public key will be stored on the each data collection device for use in encrypting data that is being acquired. The method 500 also includes setting access to DMKM allowed resources and behavior for each data collection device according to the policies established for the cluster, as shown at block 512. The method 500 concludes at block 514 by marking a normal operation mode on all of the data collection devices.

Figure 6:
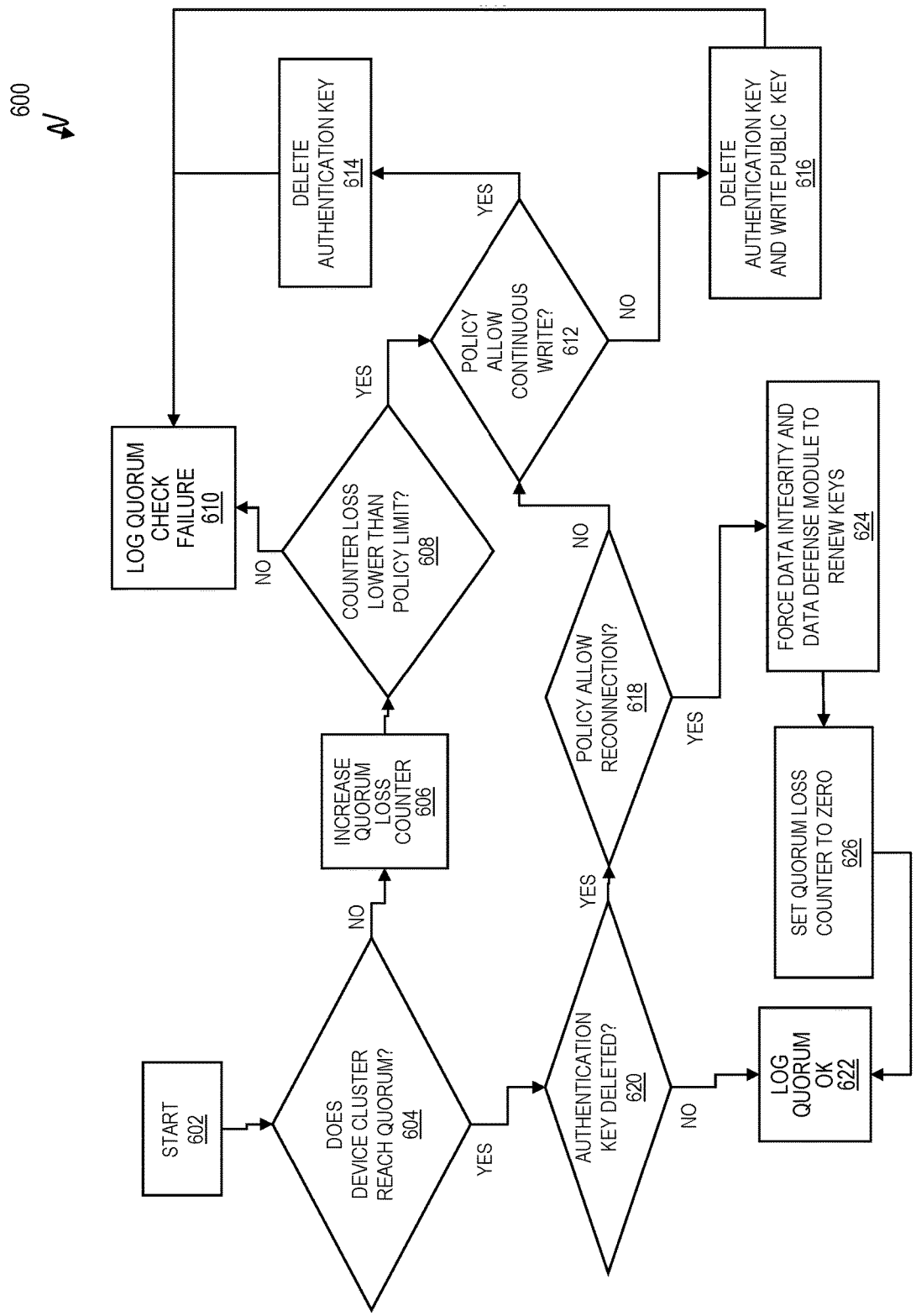
FIG. 6 is a flowchart of a method for performing a quorum check on a data collection device in a cluster of data collection devices in accordance with one or more embodiments of the present invention.

Referring now to FIG. 6, a flowchart of a method 600 for performing a quorum check on a data collection device in a cluster of data collection devices in accordance with one or more embodiments of the present invention is shown. The method 600 begins at start block 602. Next, as shown at decision block 604, the method 600 includes determining whether the cluster of devices in communication with the data collection device reaches a quorum, i.e., is the number of data collection devices that a currently connected to the cluster meet or exceed a threshold minimum number specified by the quorum policy. If a quorum is not reached, the method 600 proceeds to block 606 and increases a quorum loss counter. After the quorum loss counter is incremented, the method 600 proceeds to decision block 608 and determines whether the quorum loss counter is lower than a threshold maximum set by the policy. If the quorum loss counter is not greater than the threshold maximum, the method 600 proceeds to block 610 and the quorum check completes with an indication of the quorum not being met. If the quorum loss counter is greater than the threshold maximum, the method 600 proceeds to decision block 612.

If at decision block 604, it is determined that the quorum is reached, the method 600 proceeds to decision block 620 and determines if the authentication key, which is the key used to access the DMKM, has been deleted. If the authentication key has not been deleted, the method 600 proceeds to block 622 and the quorum check successfully completes. If the authentication key has been deleted, the method 600 proceeds to decision block 618 and determines whether the policy allows the data collection device to reconnect to the cluster. If the policy does allows the data collection device to reconnect to the cluster, the method 600 proceeds to block 624 and forces execution of the data integrity module and data defense module to obtain a new authentication and public keys. After successful execution of the data integrity module and data defense module the method 600 proceeds to block 626 and resets the quorum loss counter to zero. If, at decision block 618, it is determined that the policy does not allow the data collection device to reconnect to the cluster, the method 600 proceeds to decision block 612.

As shown at decision block 612, the method 600 includes determining whether the policy allows continuous writing of data by the data collection device. If the policy allows continuous writing of data by the data collection device, the method 600 proceeds to block 614 and deletes the authentication key. If the policy does not allow continuous writing of data by the data collection device, the method 600 proceeds to block 614 and deletes the authentication key and the public key. Once the authentication key and/or public keys have been deleted, the method 600 proceeds to block 610 and the quorum check completes with an indication of the quorum not being met.

Figure 7:
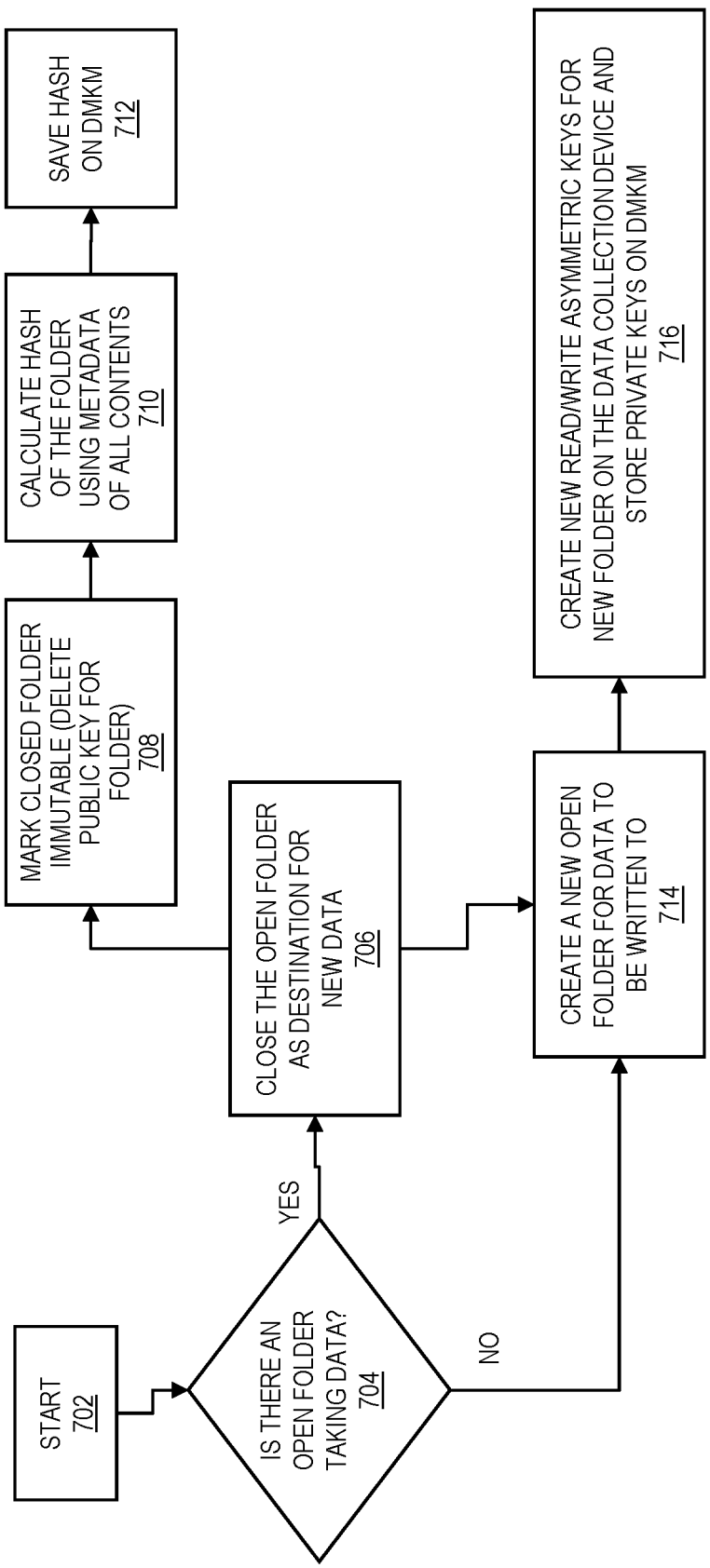
FIG. 7 is a flowchart of a method for performing a data integrity check on a data collection device in accordance with one or more embodiments of the present invention.

Referring now to FIG. 7, a flowchart of a method 700 for performing a data integrity check on a data collection device in accordance with one or more embodiments of the present invention is shown. The method 700 begins at start block 702. Next, as shown at decision block 704, the method 700 includes determining whether there is an open folder to write encrypted data to. If there is not an open folder, the method 700 proceeds to block 714 and creates a new open folder for data captured by the data collection device to be written to. Next, as shown at block 716, the method 700 includes creating a new read/write asymmetric keys for new folder on the data collection device and storing the private keys on the DMKM.

If, at decision block 704, it is determined that there is an open folder to write encrypted data to, the method 700 proceeds to block 706 and closes the open folder as the destination for new data. After the open folder has been closed, the method 700 proceeds to block 708 and block 714 in parallel. As shown at block 708, the method 700 includes marking the closed folder as immutable and deleting the public key associated with that folder. Next, as shown at block 710, the method 700 includes calculating a hash of the folder using the metadata of all contents. The method 700 completes at block 712 by saving the calculated hash value on the DMKM.

Figure 8:
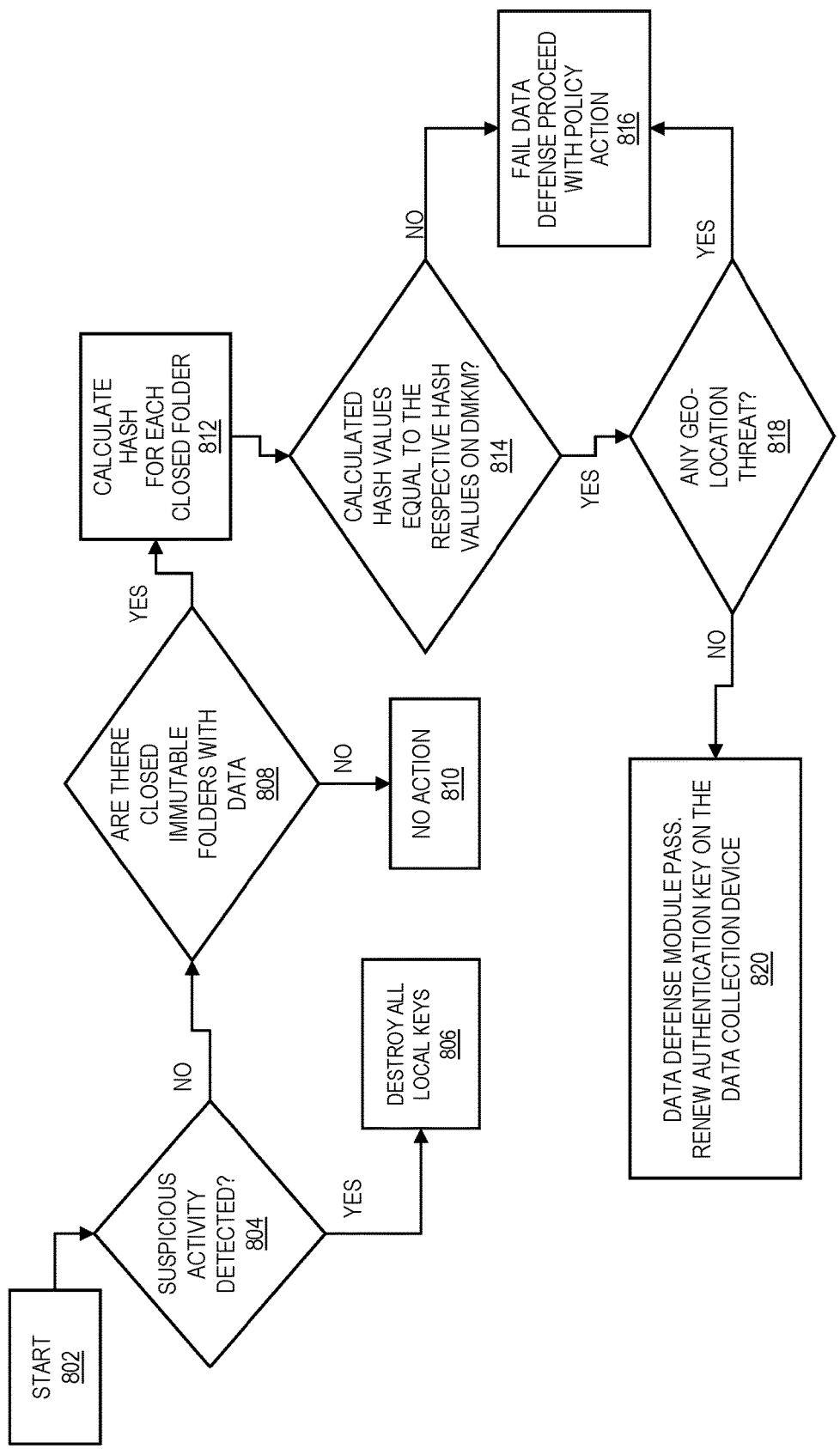
FIG. 8 is a flowchart of a method for performing a data defense on a data collection device in accordance with one or more embodiments of the present invention.

Referring now to FIG. 8, a flowchart of a method 800 for performing a data defense on a data collection device in accordance with one or more embodiments of the present invention is shown. The method 800 begins at start block 802. Next, as shown at decision block 804, the method 800 includes determining whether a suspicious activity has been detected on the data collection device. In exemplary embodiments, the policy set at the creation of the cluster of data collection devices specifies the actions that are identified as suspicious activity. In one example, the suspicious activity can include a root log in access attempt, a number of failed login attempts, a loss of connection to the cluster for a prolonged period of time, and the like. If a suspicious activity has been detected, the method 800 proceeds to block 806 and all local keys, i.e., the public keys and the authentication keys, on the data collection device are deleted.

If a suspicious activity has not been detected, the method 800 proceeds to block decision block 808 and determines whether there are any closed immutable folders with data. If there are none, the method 800 proceeds to block 810 and the data defense module closes without taking any action. If there are closed immutable folders with data, the method 800 proceeds to block 812 and calculates a hash for each closed folder. Next, as shown at decision block 814, the method 800 includes performing a data integrity check to ensure that all hash equal to the respective hashes stored on the DMKM. If the data integrity check fails, the method 800 proceeds to block 816 and the method 800 provides an indication of a failure and takes an action determined by the set policies. Otherwise, the method 800 proceeds to decision block 818 and determines whether a geo-location threat has been detected. In exemplary embodiments, a geo-location threat is based on a data collection device going outside of a geo-fenced area. If a geo-location threat is detected, the method 800 proceeds to block 816. Otherwise, the method 800 proceeds to block 820 and indicates that the data defense module has successfully completed and renews the authentication key on data collection device.

Figure 9:
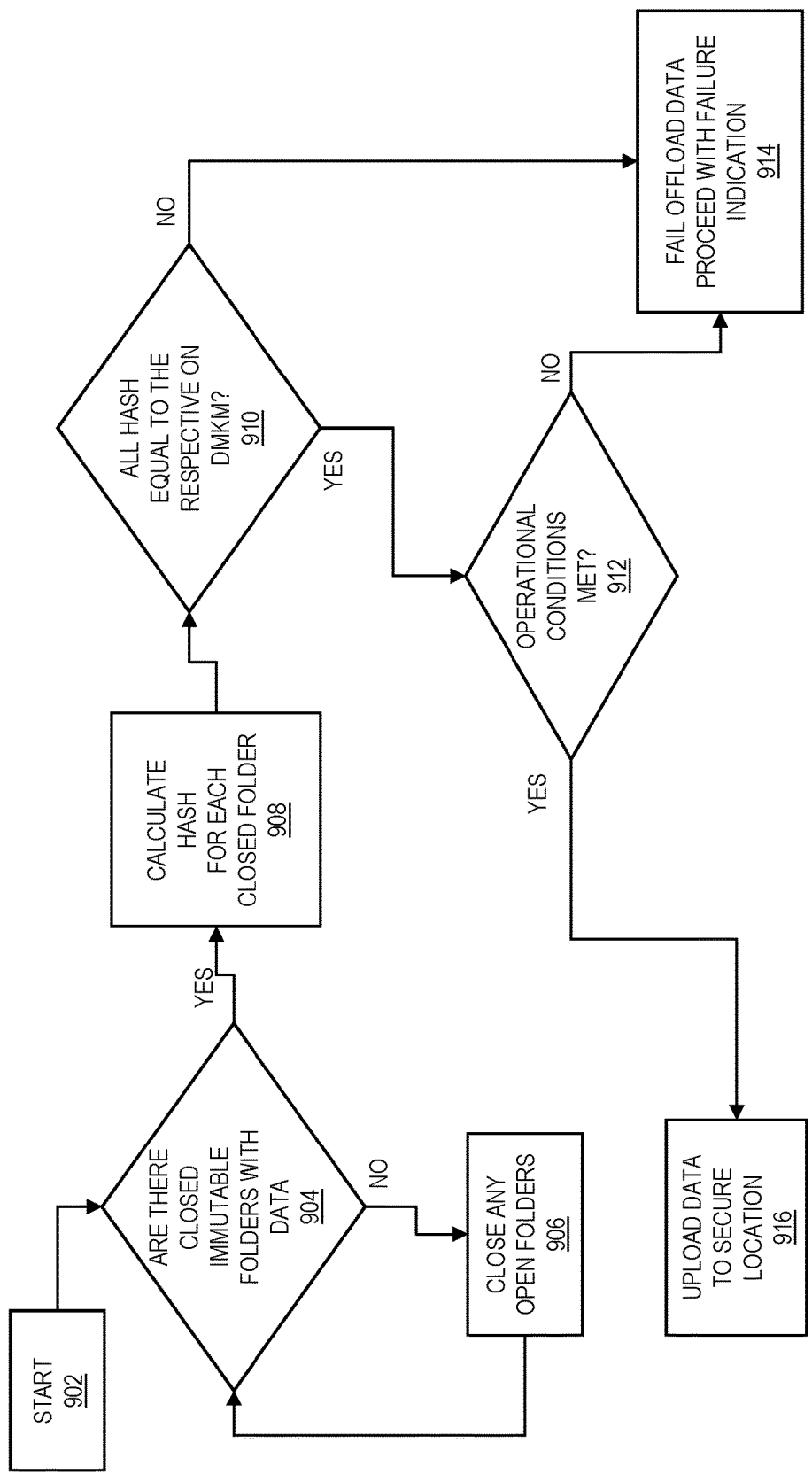
FIG. 9 is a flowchart of a method for offloading data from a data collection device in accordance with one or more embodiments of the present invention.

Referring now to FIG. 9, a flowchart of a method 900 for offloading data from a data collection device in accordance with one or more embodiments of the present invention is shown. The method 900 begins at start block 902. Next, as shown at decision block 904, the method 900 includes determining whether there are closed immutable folders with data. If there are no closed immutable folders with data, the method 900 proceeds to block 906 and closes any open folders. Otherwise, the method 900 proceeds to block 908 and calculates a hash value for each closed folder. Next, as shown at decision block 910, the method includes determining whether all calculated has values are equal to the respective stored hash values on the DMKM. If one or more of the hash values are not equal, the method 900 proceeds to block 914 and the data offload fails and provides an indication of the cause of the failure, as specified in the policy. Otherwise, the method 900 proceeds to decision block 912 and determines if other operational conditions for a data offload specified in the policy are met. In exemplary embodiments, the operational conditions for a data offload specified in the policy can include a specified location(s) and/or time(s) that a data offload is permitted. In one embodiment, the operational conditions for a data offload specified in the policy can include a minimum offload quorum of the cluster required to perform a data offload. If the operational conditions are met, the method 900 proceeds to block 916 and uploads the data to a secure location.

Figure 10:
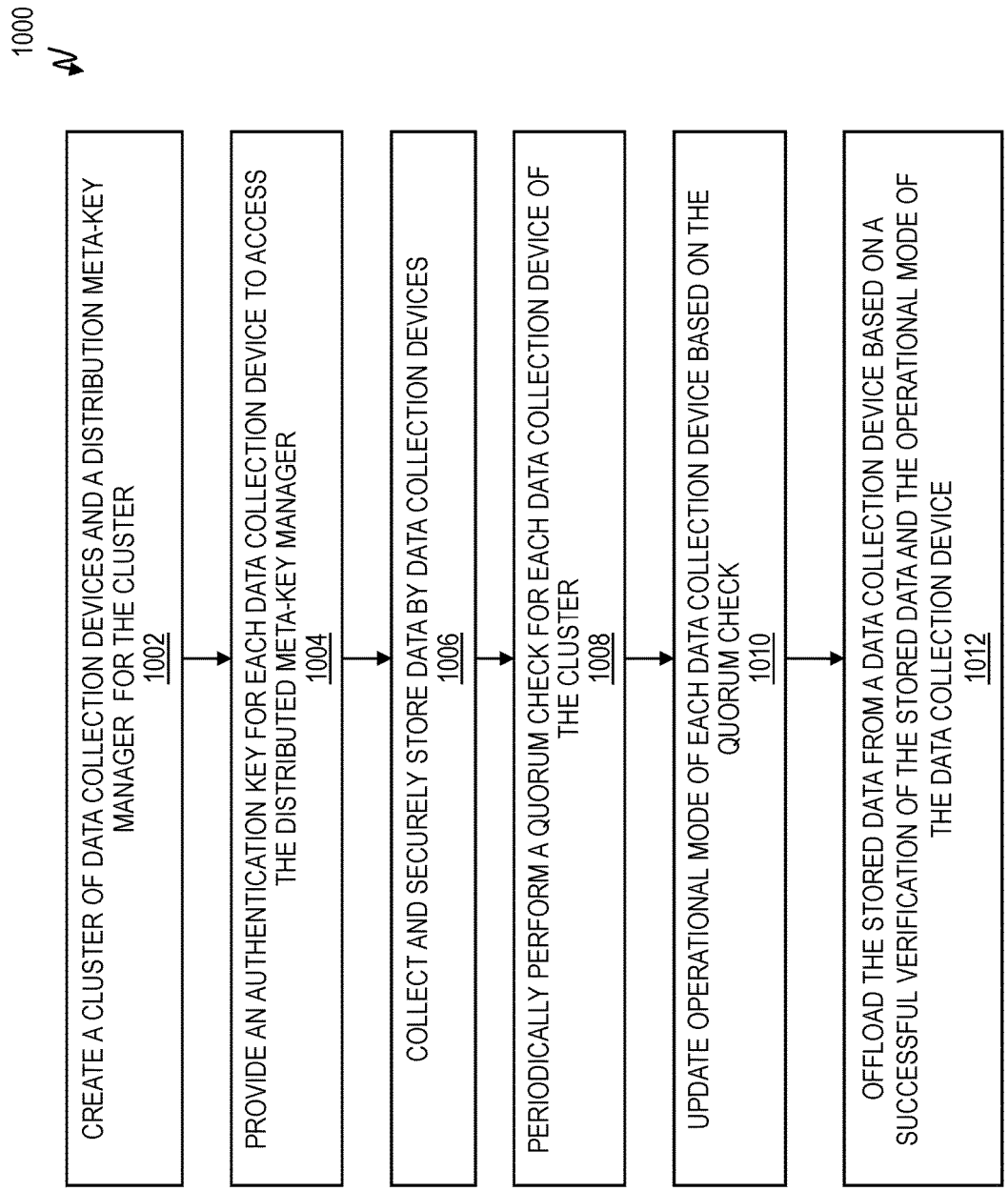
FIG. 10 is a flowchart of another method for the management of data collection devices in accordance with one or more embodiments of the present invention.

Referring now to FIG. 10, a flowchart of a method 1000 for the management of data collection devices in accordance with one or more embodiments of the present invention is shown. As shown at block 1002, the method 1000 includes creating a cluster of data collection devices and a distribution meta-key manager for the cluster. In exemplary embodiments, a policy governing the operation of the cluster of data collection devices is used to create the cluster and the policies are stored in the distribution meta-key manager on each data collection device. Next, as shown at block 1004, the method 1000 includes providing an authentication key for each data collection device to access the distributed meta-key manager. In exemplary embodiments, access to the distributed meta-key manager by a data collection device requires that the data collection device successfully pass the quorum check. In other words, a single data collection device alone cannot access the distributed meta-key manager, rather the data collection device needs to be connected to a minimum number of other data collection devices of the cluster to be able to access the distributed meta-key manager.

Next, as shown at block 1006, the method 1000 includes collecting and storing data by one or more of the data collection devices. In exemplary embodiments, public keys are provided by the DMKM to each data collection device in the cluster and the public keys are used by each data collection device to encrypt data collected by the data collection device. The collected data is encrypted and stored into folders stored in the memory of the data collection device. In exemplary embodiments, each time a folder is closed a hash value is calculated for the folder and stored in the DMKM.

The method 1000 also includes periodically performing a quorum check for each data collection device of the cluster, as shown at block 1008. In exemplary embodiments, performing the quorum check for a data collection device of the cluster includes determining a number of members of the cluster that are in communication with the data collection device. In one embodiment, performing the quorum check further includes increasing a quorum loss counter of the data collection device when the number is less than a threshold quorum amount. In exemplary embodiments, performing the quorum check further includes deleting the authentication key of the data collection device based on a determination that the quorum loss counter exceeds a maximum quorum loss threshold. The threshold quorum amount and the maximum quorum loss threshold are specified in a policy that is used to create the cluster as well as the interval periods for the check is also defined in a policy at the time of cluster creation.

The method 1000 also includes updating an operational mode of each data collection device based on the quorum check as shown at block 1008. In exemplary embodiments, the operation mode of the data collection device may indicate whether the data collection device passed the quorum check, whether the data collection device is currently recording data, whether the data collection device has an active authentication key, and/or a location of the data collection device. The method 1000 concludes at block 1012 by offloading the stored data from a data collection device based on successful verification of the stored data and the operational mode of the data collection device. In exemplary embodiments, verification of the stored data includes calculating a hash value for each folder of stored data and comparing the calculated hash values to previously stored hash values for each folder obtained from the distributed meta-key manager.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of #8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for management of data collection devices comprising:
   creating a cluster of data collection devices and a distributed meta-key manager for the cluster;
   providing an authentication key for each data collection device to access the distributed meta-key manager;
   collecting and storing data by one or more of the data collection devices;
   periodically perform a quorum check for each data collection device of the cluster;
   updating an operational mode of each data collection device based on the quorum check; and
   based on successful verification of the stored data and the operational mode of the data collection device, offloading the stored data from a data collection device.

2. The method of claim 1, further comprising providing a public key to each data collection device, wherein the public key is used to encrypt data collected by the data collection device.

3. The method of claim 1, wherein performing the quorum check for a data collection device of the cluster includes determining a number of members of the cluster that are in communication with the data collection device.

4. The method of claim 3, wherein performing the quorum check further includes increasing a quorum loss counter of the data collection device when the number is less than a threshold quorum amount.

5. The method of claim 4, wherein performing the quorum check further includes deleting the authentication key of the data collection device based on a determination that the quorum loss counter exceeds a maximum quorum loss threshold.

6. The method of claim 5, wherein the threshold quorum amount and the maximum quorum loss threshold are specified in a policy that is used to create the cluster.

7. The method of claim 1, wherein verification of the stored data includes calculating a hash value for each folder of stored data and comparing the calculated hash values to previously stored hash values for each folder obtained from the distributed meta-key manager.

8. The method of claim 1, wherein access to the distributed meta-key manager by a data collection device requires that the data collection device successfully pass the quorum check.

9. A system comprising:
a memory having computer readable instructions; and
one or more processors for executing the computer readable instructions, the computer readable instructions controlling the one or more processors to perform operations comprising:
creating a cluster of data collection devices and a distributed meta-key manager for the cluster;
providing an authentication key for each data collection device to access the distributed meta-key manager;
collecting and storing data by one or more of the data collection devices;
periodically perform a quorum check for each data collection device of the cluster;
updating an operational mode of each data collection device based on the quorum check; and
based on successful verification of the stored data and the operational mode of the data collection device, offloading the stored data from a data collection device.

10. The system of claim 9, wherein the operations further comprise providing a public key to each data collection device, wherein the public key is used to encrypt data collected by the data collection device.

11. The system of claim 9, wherein performing the quorum check for a data collection device of the cluster includes determining a number of members of the cluster that are in communication with the data collection device.

12. The system of claim 11, wherein performing the quorum check further includes increasing a quorum loss counter of the data collection device when the number is less than a threshold quorum amount.

13. The system of claim 12, wherein performing the quorum check further includes deleting the authentication key of the data collection device based on a determination that the quorum loss counter exceeds a maximum quorum loss threshold.

14. The system of claim 13, wherein the threshold quorum amount and the maximum quorum loss threshold are specified in a policy that is used to create the cluster.

15. The system of claim 9, wherein verification of the stored data includes calculating a hash value for each folder of stored data and comparing the calculated hash values to previously stored hash values for each folder obtained from the distributed meta-key manager.

16. The system of claim 9, wherein access to the distributed meta-key manager by a data collection device requires that the data collection device successfully pass the quorum check.

17. A computer program product comprising a computer readable storage medium having program instructions embodied therewith, the program instructions executable by a processor to cause the processor to perform operations comprising:
creating a cluster of data collection devices and a distributed meta-key manager for the cluster;
providing an authentication key for each data collection device to access the distributed meta-key manager;
collecting and storing data by one or more of the data collection devices;
periodically perform a quorum check for each data collection device of the cluster;
updating an operational mode of each data collection device based on the quorum check; and
based on successful verification of the stored data and the operational mode of the data collection device, offloading the stored data from a data collection device.

18. The computer program product of claim 17, wherein performing the quorum check further includes increasing a quorum loss counter of the data collection device when the number is less than a threshold quorum amount.

19. The computer program product of claim 18, wherein performing the quorum check further includes deleting the authentication key of the data collection device based on a determination that the quorum loss counter exceeds a maximum quorum loss threshold.

20. The computer program product of claim 19, wherein the threshold quorum amount and the maximum quorum loss threshold are specified in a policy that is used to create the cluster.

* * * * *